April 24, 1956  F. J. GILLIGAN  2,743,073
ARRESTING WIRE DISENGAGING DEVICE
Filed Jan. 18, 1955
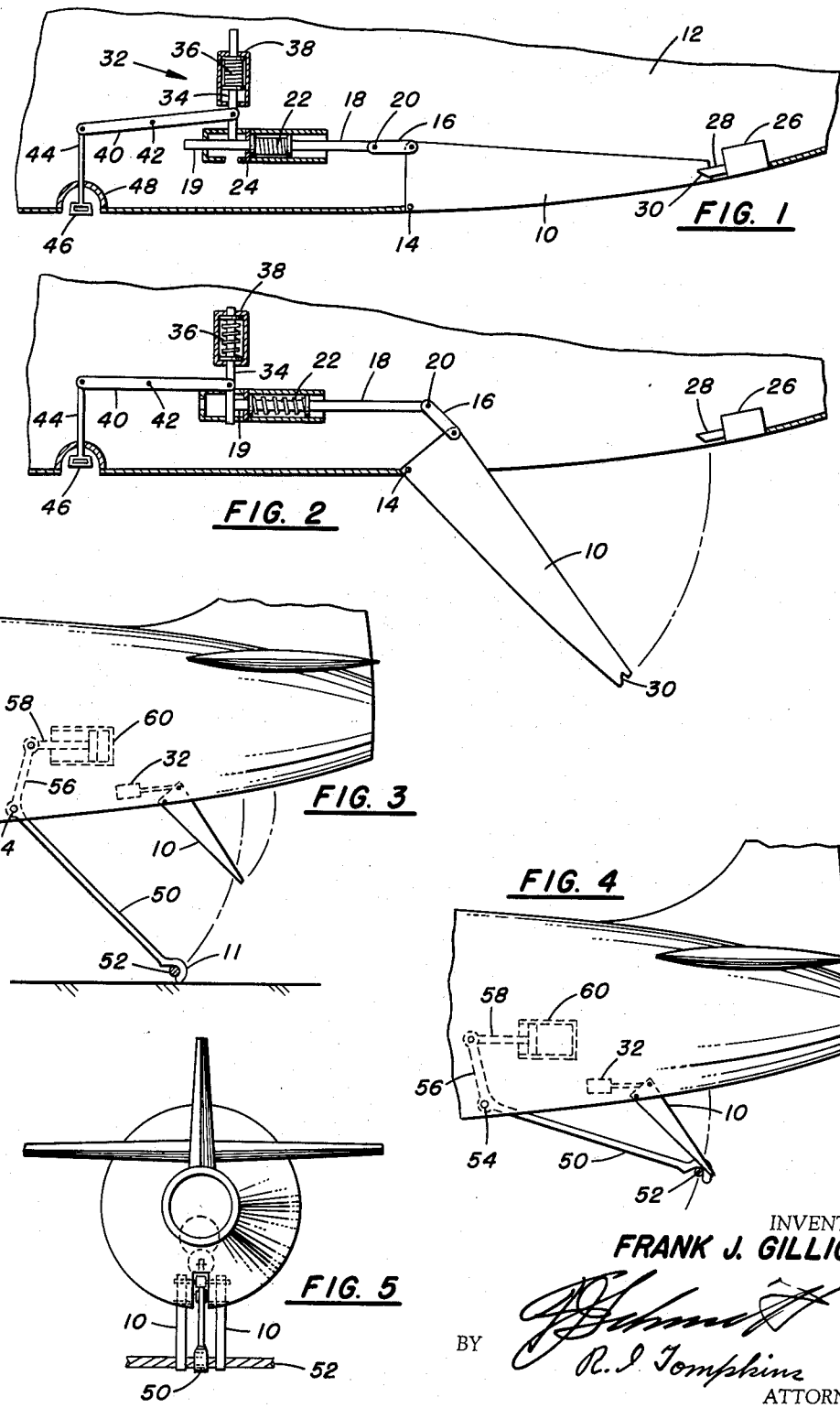
INVENTOR
FRANK J. GILLIGAN
BY
ATTORNEYS

United States Patent Office 2,743,073
Patented Apr. 24, 1956

2,743,073

ARRESTING WIRE DISENGAGING DEVICE

Frank J. Gilligan, Prince Georges County, Md.

Application January 18, 1955, Serial No. 482,686

8 Claims. (Cl. 244—110)

(Granted under Title 35, U. S. Code (1952), sec. 266)

The invention described herein may be manufactured and used by or for the Government of the United States of America for governmental purposes without the payment of any royalties thereon or therefor.

This invention relates to a device to disengage the arresting wire from the arresting hook of an aircraft.

In landing aircraft in small spaces, such as the deck of an aircraft carrier, it has become standard practice to provide the aircraft with a hook member to engage with one or more wires placed across the runway or deck, transverse to the direction of flight of the aircraft. In practice, the hook is swung downwardly from a retracted position to an action position as the aircraft prepares to land. After the hook member engages the wire, the wire is connected to a brake which rapidly decelerates the aircraft to a stop. For operations on board an aircraft carrier, it is important that an airplane once stopped be quickly disengaged from the arresting wire and removed from the landing area on the deck, in order to permit the landing of the next aircraft. Thus, it may be seen that the quick disengagement of the hook from the wire is very important in aircraft carrier operations, inasmuch as failure to do this may result in a "wave off" of the next airplane in line, thus endangering the personnel of that airplane if it should be damaged or so low on fuel that another landing cycle could not be completed.

In order to insure rapid disengagement of the wire, the present invention provides a member to engage the wire as it is carried upward by the hook as the hook is retracted, after the airplane is brought to a stop.

Accordingly, an object of the present invention is to provide means for rapidly and positively disengaging an arresting wire from an arresting wire hook.

Another object of the invention is to provide arresting wire disengaging means which will not increase aerodynamic drag on the aircraft when in normal flight.

Still another aim of the invention is to provide an arresting wire disengaging means which does not require additional parts associated with or attached to the hook itself, so that a sturdy, simple hook may be employed.

Another purpose of the invention is to provide an arresting wire disengaging means which is strong and positive in operation.

Other objects and many of the attendant advantages of this invention will be readily appreciated as the same becomes better understood by reference to the following detailed description when considered in connection with the accompanying drawings wherein:

Fig. 1 is a cut-away side view of the rear of an airplane equipped with a preferred embodiment of the arresting wire disengaging means of the invention, Fig. 2 is a view similar to Fig. 1, showing the arresting wire disengaging means in action position, Fig. 3 is a side view of an airplane with the arresting wire disengaging means and arresting wire hook both in action position, Fig. 4 is a side view of a section of an airplane showing the arresting wire being disengaged by the arresting wire disengaging means, and, Fig. 5 is an end view of the airplane with the parts in position as shown in Fig. 4.

Referring now to the drawings wherein like reference characters designate like or corresponding parts throughout the several views, there is shown in Fig. 1 wire disengaging means 10, which may conveniently be made from a channel section, or a T section, as dictated by engineering practice. Means 10 is pivotally attached to the fuselage 12 of an aircraft by hinge 14. Attached to ear 16 of means 10 is a link 18, by means of a pivot 20. Link 18 is urged toward means 10, to the right as shown in Fig. 1, by a spring 22 abutting against a stop 24; thus, the spring 22 tends to rotate means 10 about hinge 14. Such rotation is prevented by a solenoid lock 26 having a detent 28 engaged in a notch 30 on the free end of means 10. Detent 28 is urged into engaging position by a spring (not shown), and is so shaped in connection with the notch 30, that when means 10 is rotated into the retracted position shown in Fig. 1 the detent 28 will yield to permit the seating of means 10, and will then protrude to engage with notch 30.

A safety lock for the means 10 is generally designated at 32 and comprises a pin 34 urged downwardly by a spring 36 acting against abutment 38 and into engagement with a portion of link 18 adjacent its free end 19. A lever 40 is connected to the fuselage 12 by a pivot pin 42, and has one end pivotally attached to pin 34. The other end of lever 40 has pivotally attached thereto a link 44 having a handle 46, located in well 48 in the fuselage 12.

In Fig. 3, arresting wire hook 50 is shown in action position, where it is in engagement with arresting wire 52. Arresting wire hook 50 is pivotally attached to the fuselage 12 by a hinge 54, and is rotated about hinge 54 by any convenient means, such as a lever 56 pivotally attached to the piston rod 58 of an hydraulic motor 60. Arresting wire disengaging means 10 is shown in action position in Fig. 3.

In Fig. 4, the arresting wire hook 50 is shown being retracted, with the arresting wire 52 still engaged therewith. At this point in the travel, arresting wire 52 will be engaged by means 10, which will prevent the further upward movement of arresting wire 52, because means 10 lies across the path of the arresting wire 52 as it is carried upwards by the arresting wire hook 50. Arresting wire hook 50 will continue its travel, now disengaged from arresting wire 52, and will return to the retracted position.

Fig. 5 shows the parts in the same position as in Fig. 4, further illustrating the manner in which arresting wire disengaging means 10 performs its function. It will be noted that means 10 is here shown in its preferred form as comprising a fork-like member having two prongs.

In operation, when the aircraft descends along its landing path, the arresting wire hook 50 is put in its action position. Thereafter, the aircraft continues its descent, makes its landing, and the arresting wire 52, having been engaged by hook 50, brings the aircraft to a stop. The pilot then actuates the hook retracting mechanism which causes the hook 50 to rotate upwardly about hinge 54. Upon actuation of the hook retracting mechanism solenoid lock 26 is energized by suitable means (not shown). The solenoid upon being energized withdraws detent 28 from notch 30 in means 10. Spring 22 will then cause link 18 to rotate means 10 about hinge 14 into its down or action position. Free end 19 will slide along underneath pin 34 toward member 10 until it clears past the pin and then pin 34, under the urging of spring 36 will assume its extended position as shown in Fig. 2.

As hook 11 continues to rotate upwardly (see Fig. 4) it will pass beside (or between) means 10, which will then engage with arresting wire 52, and prevent it from being carried any further by hook 50. Wire 52 will thus be disengaged from hook 50, and will return to the deck (or ground). Means 10 will be prevented from rotating upwardly under the urging of wire 52 by abutment of free end 19 of link 18 against the side of pin 34. Thereafter, a crew member can retract pin 34 by pulling on handle 46, and then rotate means 10 into its retracted position where detent 28 will engage with notch 30 of means 10, and hold it in its retracted position. Member 10 will then be flush with fuselage 12.

Obviously many modifications and variations of the present invention are possible in the light of the above teachings. It is therefore to be understood that within the scope of the appended claims the invention may be practiced otherwise than as specifically described.

What is claimed is:

1. In an aircraft, a hook pivotally attached thereto for engaging an arresting wire, means to rotate said hook to and from an action position, and wire disengaging means pivotally attached to said aircraft independently of said hook for rotation into the path of the wire when it is being raised by said hook to thereby contact said wire and disengage it from said hook.

2. An aircraft comprising an arresting wire hook pivotally attached to said aircraft at the rear underside thereof, means to selectively rotate said arresting wire hook between a retracted position and an action position, an arresting wire disengaging means pivotally attached to said aircraft at the rear underside thereof, laterally displaced from said arresting wire hook, means to cause said arresting wire disengaging means to rotate between a retracted position and an action position, said arresting wire disengaging means when in action position lying across the path of said arresting wire as it is carried upwards by said arresting wire hook as said arresting wire hook is being rotated from its action position to its retracted position.

3. In an aircraft, apparatus comprising an arresting wire hook pivotally attached to said aircraft at the rear underside thereof, means to selectively rotate said arresting wire hook between a retracted position and an action position, an arresting wire disengaging means pivotally attached to said aircraft at the rear underside thereof, said arresting wire disengaging means being laterally displaced from said arresting wire hook, spring means urging said arresting wire disengaging means into its action position, releasable detent means engageable with said arresting wire disengaging means to retain said arresting wire disengaging means in its retracted position, said arresting wire disengaging means when in action position lying across the path of said arresting wire as said arresting wire is carried upwards by said arresting wire hook while said arresting wire hook is being rotated from its action position to its retracted position.

4. An aircraft comprising an arresting wire hook pivotally attached to said aircraft at the rear underside thereof, means to selectively rotate said arresting wire hook between a retracted position and an action position, an arresting wire disengaging means pivotally attached to said aircraft at the rear underside thereof, said arresting wire disengaging means being laterally displaced from said arresting wire hook, spring means urging said arresting wire disengaging means into its action position, solenoid actuated detent means engageable with said arresting wire disengaging means to retain said arresting wire disengaging means in its retracted position, said arresting wire disengaging means when in action position lying across the path of said arresting wire as said arresting wire is carried upwards by said arresting wire hook as said arresting wire hook is being rotated from its action position to its retracted position.

5. An aircraft comprising an arresting wire hook pivotally attached to said aircraft at the rear underside thereof, means to selectively rotate said arresting wire hook between a retracted position and an action position, an arresting wire disengaging means pivotally attached to said aircraft at the rear underside thereof, said arresting wire disengaging means being laterally displaced from said arresting wire hook, spring means urging said arresting wire disengaging means into its action position, releasable detent means engageable with said arresting wire disengaging means to retain said arresting wire disengaging means in its retracted position, safety lock means retaining said arresting wire disengaging means in action position, release means for said safety lock means, said arresting wire disengaging means when in action position lying across the path of said arresting wire as said arresting wire is carried upwards by said arresting wire hook upon rotation of the arresting wire hook from its action position to its retracted position.

6. Aircraft apparatus comprising an arresting wire hook pivotally attached to said aircraft at the rear underside thereof, means to selectively rotate said arresting wire hook between a retracted position and an action position, an arresting wire disengaging means pivotally attached to said aircraft at the rear underside thereof, said arresting wire disengaging means being laterally displaced from said arresting hook, an axially moveable link having one end pivotally connected to said arresting wire disengaging means and having its other end free, a spring acting on said link and urging said arresting wire disengaging means into its action position, releasable detent means engageable with said arresting wire disengaging means to retain said arresting wire disengaging means in its retracted position, said axially moveable link having a first position corresponding to the retracted position of said arresting wire disengaging means and a second position corresponding to the action position of said arresting wire disengaging means, a spring-urged axially moveable pin having a first position wherein it abuts against and is intercepted by a side of said link adjacent said link's free end when said link is in its first position, the free end of said link being withdrawn from intercepting said pin when said link assumes its second position, said pin then assuming its second position under the urging of its spring, whereby the pin intercepts the free end of said link and thus serves as a lock for said arresting wire disengaging means, said arresting wire disengaging means when in action position lying across the path of said arresting wire as said wire is carried upwards by said arresting wire hook as said hook is being rotated from its action position to its retracted position.

7. The apparatus as defined in claim 6 including handle means accessible from the exterior of said aircraft and means connecting said handle means to said pin, whereby said pin may be retracted by actuation of said handle means.

8. An arresting wire disengaging means for use in connection with the arresting hook of an aircraft comprising a moveable disengaging member carried directly by the aircraft and having a retracted position, a hook moveable between a retracted position and a wire arresting position wherein it is adapted to engage an arresting wire, and means to move said disengaging member from its retracted position into a position lying across the path of the arresting wire as said arresting wire is raised by the hook when the hook is retracted.

References Cited in the file of this patent

UNITED STATES PATENTS

| | | |
|---|---|---|
| 1,952,499 | Howland | Mar. 27, 1934 |
| 2,404,381 | Jolly | July 23, 1946 |

FOREIGN PATENTS

| | | |
|---|---|---|
| 574,543 | Great Britain | Feb. 25, 1935 |
| 611,954 | Great Britain | Nov. 5, 1948 |